July 10, 1934.  A. FRIED  1,966,092
COMBINATION CAMERA AND FINDER
Filed April 24, 1931  3 Sheets-Sheet 1
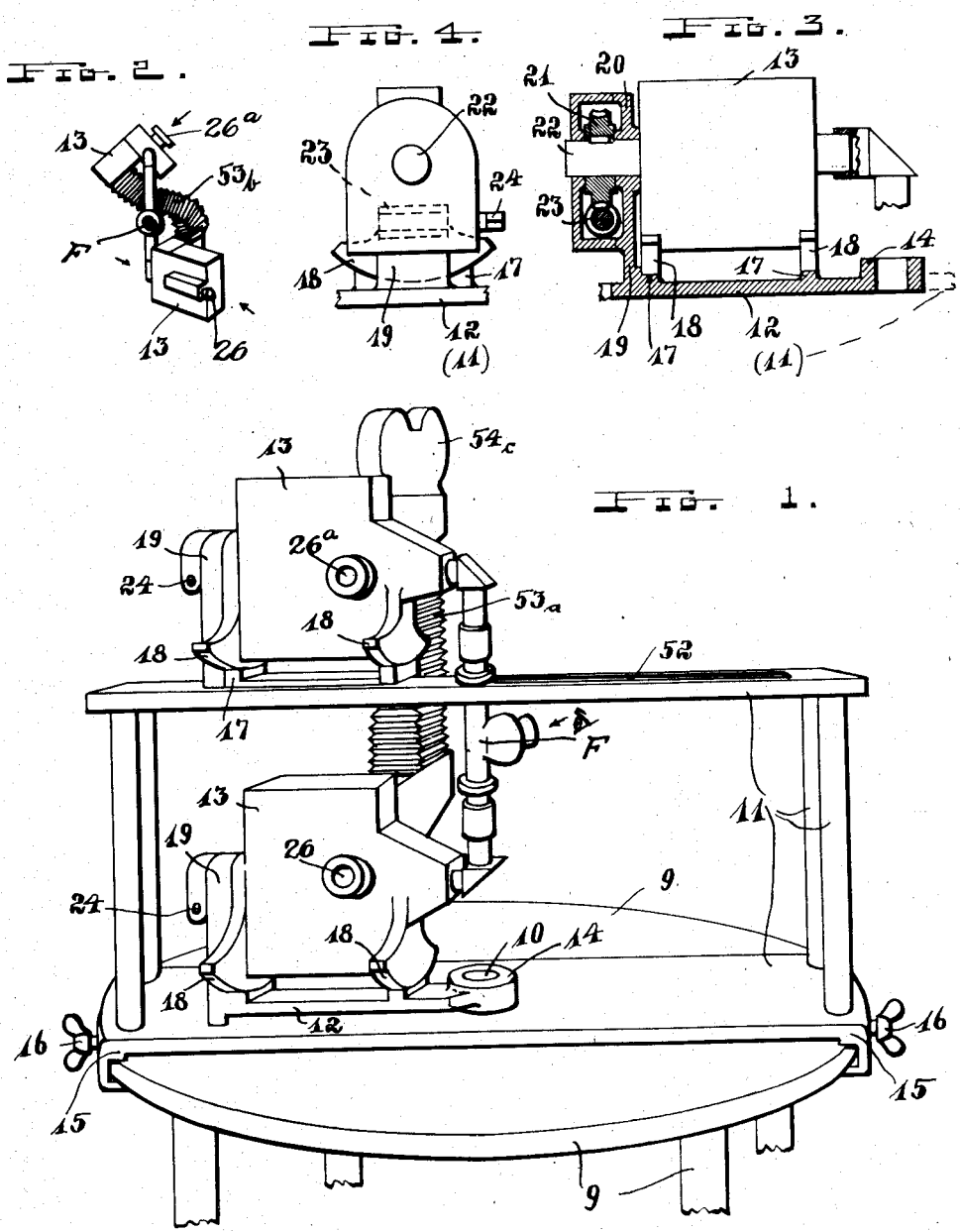
INVENTOR:
ARMIN FRIED,

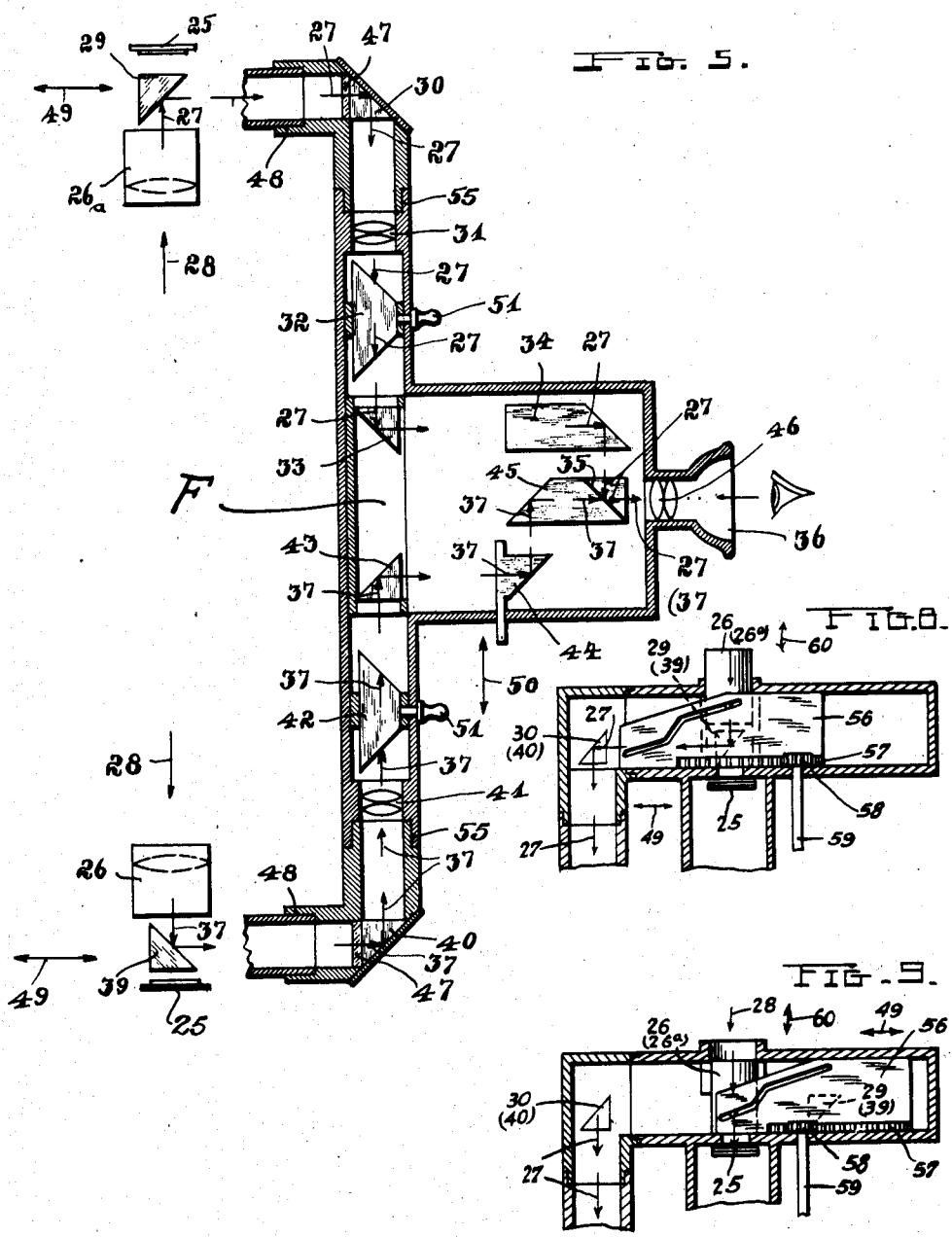

July 10, 1934.  A. FRIED  1,966,092
COMBINATION CAMERA AND FINDER
Filed April 24, 1931   3 Sheets-Sheet 3
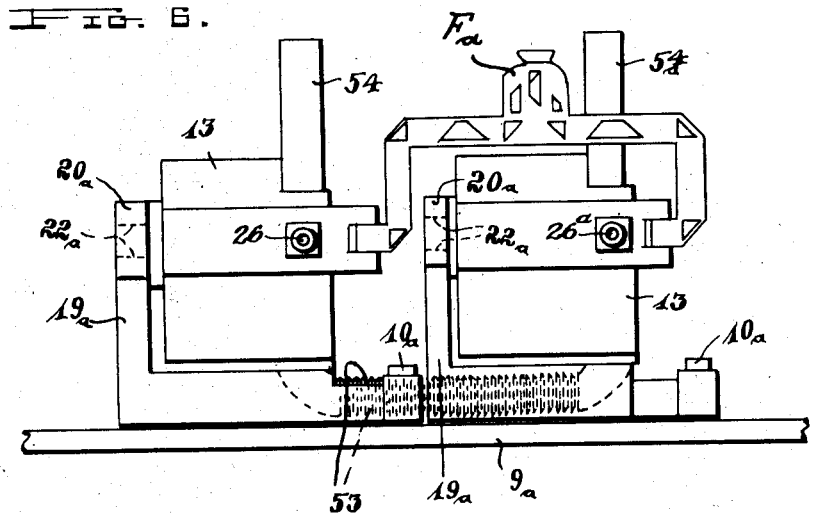
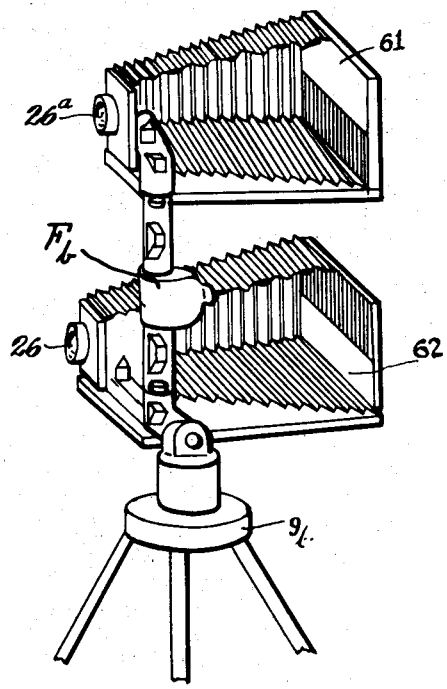
INVENTOR:
ARMIN FRIED,
By Otto H. Kruger,
his Atty.

Patented July 10, 1934

1,966,092

BEST AVAILABLE COP'

UNITED STATES PATENT OFFICE 1,966,092

COMBINATION CAMERA AND FINDER

Armin Fried, Los Angeles, Calif.

Application April 24, 1931, Serial No. 532,546

8 Claims. (Cl. 88—16)

This invention relates to devices used for taking photographs by more than one exposure by a simultaneously operating apparatus embodying distinct mechanisms for similar operations.

One of the objects of this invention is to provide means whereby the distinct functions of distinct mechanisms and the combined photographic results of more than one exposure are observably under control of the operator at all times.

Another object is to provide cameras swingable around a vertical axis as well as around a horizontal axis.

Another object is to provide a finder for such a combination of doubly swingable cameras whereby a combination exposure can be observed at one glance.

Another object is to provide a camera and finder combination whereby different portions of a sensitized surface can be exposed in a single combined operation for which a proper, or suitable, or desired relation of different objects has been established and checked off by the operator by means of a common finder to result in a desired composite image in the exposures obtained through cooperatively connected cameras.

Other objects will appear from the following description and appended claims as well as from the accompanying drawings, in which—

Fig. 1 is a rough outline of an apparatus whereby two cameras can be supported to be swung around a common vertical axis and distinct horizontal axes with a common finder.

Fig. 2 is a perspective view illustrating two cameras pointed at distinctly different directions and at different angles with respect to the horizontal and vertical.

Fig. 3 is a fragmentary vertical section through a swingable supporting frame for a camera, illustrating means whereby the camera can be swung around an axis at right angles to the axis around which the frame can swing.

Fig. 4 is an end elevation of the structure illustrated in Fig. 3.

Fig. 5 is a schematic illustration of lenses and prisms whereby the images receivable by different lenses can be observed by a single finder.

Fig. 6 is a schematic illustration of a slightly modified form of finder which can be applied to cameras placed side by side as roughly outlined.

Fig. 7 is still another slightly modified form somewhat schematically illustrating how cameras of light design can even be supported by this form of finder.

Fig. 8 is a fragmentary section through the housing and connected finder, showing the combination focusing of the main lens for the camera and finder, in focus for the finder.

Fig. 9 is a fragmentary section through the housing and connected finder, showing the combination focusing of the main lens for the camera and finder, in focus for the camera and thereby upon the film directly.

Though several exposures of a sensitized surface to result in a combination image may be said to be old, the present invention differs, in producing the several exposures by means of simultaneously cooperating cameras, either, of certain standard makes or specially designed cameras.

Making more than one exposure, moreover, involves the matching of the different exposures, which, I believe, with the present-day apparatus or processes is highly difficult and very often impossible to the point of perfection.

In having and by using a common finder for different cooperating cameras, and by having provided means for the different cameras whereby the images from the distinct cameras can be reflected to and thereby observed by the common finder, a perfect matching is made easier and more likely.

Mounting the cameras, furthermore, to swing around a vertical axis as well as around horizontal axes, at all times remaining and being in perfect focal alignment with the finder, facilitates a matching of objects and performances and actions at very different positions as well as distances from the common stand of the combination cameras, one camera, for instance, to be supplied with a lens and adjusted for very close photography while another camera can be provided with a lens and adjusted to take a distant background, to result in a very fine stereoscopic-like combination.

On the other hand, one camera can be adjusted and operated for a moving close-up and the other camera can be adjusted and operated for a still background, or the results can be of a reversed order, a still close-up and a moving background.

The main base structure 9 may be a table or adjustable tripod of any standard make, though an especially designed support may be more suitable for the other parts required for the apparatus disclosed herewith.

At the center of the base 9 a vertical shaft 10 is provided around which the secondary frames of the apparatus swing in a horizontal plane, two distinct frames 11 and 12 being indicated in Fig. 1 of the drawings, but it must, of course, be understood that I do not limit myself to this particular number and that frames may be provided according to the requirements in individual cases by different operators as long as the frames are swingable around such a vertical or common main center.

On each of the frames, a camera 13 is in turn mounted swingably around an axis transversely to the principal or common axis above referred to.

The swingable support and mounting of the camera 13 on its individual swingable frame is illustrated in detail in Figs. 3 and 4.

While the frame 12 of the one camera in Fig. 1 may terminate in the central eye-piece or part 14, the upper or upwardly extending frame 11 is preferably designed somewhat along the outlines indicated, to assure a better balancing of such upper frames, the lower portions to rest on or to contact with a suitably large portion of the base as indicated at 15, and, to facilitate a steadying of the frame, having means by which the frames can be firmly set in certain positions as by the set screws 16.

Regardless of any such details, however, the upper frame 11, and, if more upper frames are provided beyond the two illustrated in Fig. 1, each further upper frame preferably is built around the next lower frame in the manner of frame 11 or similarly.

When these upper frames extend across the table or base 9 or from one side to the opposite side, they, of course extend beyond the central eye-like piece. Nevertheless, each of such upper frames is also swingable around the common central shaft 10. All this will easily be understood without further illustration since it is in fact a mere duplication of the upper frame 11 as roughly outlined in Fig. 1.

Each of the frames is provided with bearing portions 17 on which the camera rests, the camera in each case being provided with circular portions or pieces 18 corresponding to such bearing portions 17.

A bracket 19 extends from the frame having a bearing 20 with an axis crosswise to the axis of the eye-piece 14 and thereby crosswise to the common first-named or main axis.

The engaging surfaces of the portions 17 and 18 by which a camera is supported and held are accurately finished to a radius with respect to the axis of the bearing 20 so that the whole camera is thereby accurately held and aligned with respect to this axis and transversely to the main axis, and principally so that both axes cross one another accurately at all times in any and all positions of the camera no matter how it is swung around the vertical or horizontal axes.

A worm-gear 21 is firmly secured to the pin-end 22, provided on each of the cameras, by which the cameras are swingably journaled in the bearing 20, controllable by the worm 23 and the therefrom outwardly extending pin 24.

A similar swingable support and worm and worm-gear control is provided with respect to frame 11 as well as with respect to the frame 12, and also with respect to any further frames if such are provided as set forth above.

However, though it has been stated above with reference to the illustrations in Fig. 1 that one camera is located above the other, and that the several cameras are swingable around a common vertical axis, which may be said to be also true of the slightly modified form illustrated in Fig. 7 of which further explanation will be given later on, it must not be understood that several cameras could not be mounted side by side to operate similarly and just as easily.

In the slightly modified form illustrated in Fig. 6, for instance, two cameras are shown side by side on a common table or support $9_a$, each camera having its individual axis represented by the pin or shaft $10_a$, around which the cameras in this form are swingable in a horizontal plane, and it must be understood that any number of cameras can be mounted on this base or table $9_a$ to function just as easily as if mounted to swing around a common vertical axis or shaft.

In any other respect and for every purpose that such a combination can be used, these cameras function very similarly to the cameras mounted to swing around a common vertical axis, and, as shown, swing each around an individual vertical axis as well as around a separate horizontal axis, the bearing $20_a$ on the bracket $19_a$ in conjunction with the pin-end $22_a$ on each of the cameras forming the structure by means of which the cameras can swing around a horizontal axis.

The other slightly modified form illustrated in Fig. 7 shows cameras mounted on a base in the form of a tripod $9_b$, the cameras in this form being of a lighter type than those outlined in the other illustration.

While the finders in the forms of Figs. 1 and 6 may be lightly-designed mere appliances, the finder as illustrated in the form of Fig. 7 must naturally be strong and rigid enough to properly support the upper if not even the lower camera as well.

However, in general design and with respect to the arrangements of the different parts, all the finders are very similar to one another, in having practically the same or equivalent swivel joints as well as certain prisms and lenses, to focus or reflect more than one image to a common vision-end regardless of the position of and direction in which any of a group of cameras is focused or pointed.

Any heavy standard or motion picture camera can easily be supported on the structures illustrated in Figs. 1 and 6 as well as a light camera for taking a still picture, while the form illustrated in Fig. 7 is perhaps only adapted to light cameras for taking still pictures only, since for the heavier type of cameras the finder structure would have to be unproportionally strong to assure a vibrationless support for the cameras while being swung to such various directions as referred to above.

The schematic illustration of the finder in Fig 5 gives an idea of the positions and purposes of the various prisms and lenses as well as of the swivel joints.

A separate sensitized surface has been indicated at 25 at the opposite ends of the finder but this is merely for the sake of illustrating how different or distinct images from different positions can be observed through a single vision opening of the same finder, while, in fact, on and the same sensitized surface, though different portions thereof are checked off for separate exposures, is meant, as will be more fully explained later on.

If then, two very different and distinct lenses 26 and $26_a$ of absolutely separate cameras are focused on different objects or performances, on image can be reflected in the direction of the arrows 27 through the prisms 29, 30, 32, 33, 3 and 35 to the vision magnifying lens in the vision opening 36, while another distinctly differen image can be reflected in the direction of the arrows 37 by way of the prisms 39, 40, 42, 43, 44, 45, and through the transparent prism 35 to the same vision magnifying lens 46 in the same vision opening 36.

The magnifying lens 46 in the vision opening 36 as well as the magnifying lenses 31 and 41 inserted between certain of the prisms are not absolutely necessary but more for the purpose of giving clearer and sharper and stronger reflections or images, and the use or insertion of a ground glass 47 at the points indicated or at any other place is also more a matter of choice or taste subject to the requirements of different operators or owners of such apparatus.

In order to facilitate a swinging of the operatively connected cameras, the tubing or housing of this finder-structure is provided with certain swivel-joints 55 and 48, the swivel-joints 55 allowing a swinging of the cameras around one certain axis, being the axis through all the prisms 30, 32, 33, 43, 42, and 40 and the housing enclosing these prisms, while the swivel-joints 48 allow a swinging of each camera individually around another axis which however is at all times in perfect focal alignment with the other axis by means of the prisms 30 and 40.

For finding a proper focus for any lens of any of the cameras or for the group of combined cameras, the operator can take observation through the single vision opening 36 of this combination finder, to accurately observe objects in different positions as focused through or by different lenses of different cameras as, for instance, by the lenses indicated at 26 and 26a in Fig. 5, the different focusing directions being indicated by the arrows 28.

However, it must be clear from the above that the main lens of any camera, or the main lenses of the several cameras of any group or combination used in connection or conjunction with such a finder form a part of the finder.

Considering this as a fact, it must then be clear that any composite image observed, and thereby checked off by the operator, to satisfy him, to be what is desired, as seen through the single vision-end of the finder and through the main-lenses of the combined cameras, must mean that the individual lens of any individual camera of the combination is focused so that on an operation of such a camera the exposure produced in this or such a camera will be the most accurate portion of the composite image desired.

The covering by mats or other similar suitable means for exposing only certain portions of a sensitized surface at a time is well enough known in the art as to require no further explanation or detailing, but from the above it should be understood that, by means of this combination finder, uncovered portions of different cooperating cameras can be observed much better to assure a much more accurately matched picture as a whole in the finished state, and that the individual cameras can be directed and adjusted, as to overlapping as well as to focal distance, much better while a complete and combined image can be observed and in this manner check 1 off, or established to be accurately matched in the composite image through a single opening at one glance; and such a checking-off can be maintained or practiced at intervals or at any desired or required moment during the operation of the cameras by a quick shifting of the main lenses of the cameras and of the cooperating prisms 29 and 39 in the manner disclosed in the co-pending application, filed April 20th, 1931, Ser. No. 531,372, issued in the meantime under No. 1,873,571, on Aug. 23rd, 1932.

Prisms 29 and 39 are arranged shiftably with respect to the camera-lenses 26 and 26a so that, after the operator is satisfied of having a properly matched combined image, he can shift these prisms to expose the sensitized surface 25 to the lenses 26 and 26a, the shifting directions of the prisms being indicated by the double arrows 49.

The prism 44 is also shiftable for the purpose of establishing a clear vision in one spot, the shifting direction of this prism being indicated by the double arrow 50, such aligning of prisms being also old, in the reversed order of reflecting one reflection to two spots or eyes, for instance, being very common in microscopes, for which reason no further details are given to this as it is believed that it will be understood.

For rectifying the positions of the differently reflected portions of the image as a whole to the operator, the double prisms 32 and 42 are made turnable within the finder by means of the outwardly extending handles 51, taking into consideration that it has been stated above that the different cameras may be swung not only in different directions in the same plane but also individually in planes transversely to the first plane and even at odd angles one camera to the other, from which it will be understood that the different portions of the whole image as coming from the camera-lenses may be appearing quite away from an upright position, the turning of the double prisms 32 and 42 making it possible that the image portions can be turned about to appear jointly as one image uniformly in an upright position in the vision opening.

The whole finder structure as illustrated in Fig. 5 can be removed from the swivel-joints 48 and thereby from the cooperative engagement with the cameras since the swivel joints are nothing but telescoping tubes which easily slip within one another, the finder structure being supported on the top member of the frame 11 and shiftable within the slot 52 of this member, so that the whole finder-structure can be shifted or pushed aside for the purpose of exchanging different cameras, to be shifted back again into engaging position with a newly selected camera to the position indicated in Fig. 1.

If F designates the whole finder-structure, as to the form illustrated in the Figs. 1 and 5, it will be realized that the finder Fa in the slightly modified form illustrated in Fig. 6 is very similar as a whole, except for perhaps an extra bend in the housing, necessitated by the arrangement of the cameras, but with a very similar prism-arrangement.

From the above it will also be clear that the finder-structure Fb in the other slightly modified form illustrated in Fig. 7 will be and is very similar except that the housing of this finder must be stronger as stated above; and that any finder for any further modified form will also be very similar, the principal feature of this invention being, to have suitably arranged prisms in conjunction with suitably arranged swivel-joints whereby an image can be reflected from any operatively connected camera to a single finder and for the other purposes set forth above.

For taking a combination of still pictures, a portion of one being checked off in one camera by the mask 61, and another portion being checked off in another camera by the mask 62, to result in a single composite picture when affixed together, especially with small cameras, the arrangement illustrated in Fig. 7 is complete and nothing further would be necessary. However, in taking motion pictures, bellows 53 are indicated in Fig. 6 to connect the two cameras so that the film, after having been exposed in one camera, can be passed to the other camera to be exposed immediately again in order to produce the complete image selected and checked off through the finder while the cameras were being focused through, or with the help of, or in conjunction with the finder.

In Fig. 1, it is illustrated how the bellows 53a can connect cameras when arranged one above the other.

The small perspective view in Fig. 2 illustrates how the bellows 53b can be twisted around, and, to anyone skilled in the art, it will be clear that such a twisting of the bellows and therewith any twisting of a film does not interfere with a proper operation of motion picture cameras and the films disposed therein.

In motion picture cameras, using long continuous films, the film, after one portion has been exposed in one of the cameras of the combined group of cameras, can be passed through the next camera, and from camera to camera, depending only on the choice or requirement of the operator or producer of motion pictures, and the film may start from the magazine 54 of one camera, passing through the bellows 53 between the several cameras, to be taken up in the magazine 54a of the last camera, as, for instance, indicated in Fig. 6, or, as shown in Fig. 1, the film may be caused to pass back to the take-up magazine 54c of the first camera, passing back and forth through the same bellows 53a, without any difficulty as will be understood by anyone skilled in the art.

Though the direct focal alignment of the finder with any and all the main lenses of the different connected or cooperating cameras has been clearly illustrated in Fig. 5, the shifting of the intermediate prisms 29 and 39 being indicated by the arrows 49; further illustration of these principles of positive focal alignment and the shifting of the prisms is eventually made clearer in Figs. 8 and 9.

The shiftable member 56, is the equivalent of the carriage 15 disclosed in a copending application that in the meantime resulted in Patent No. 1,873,571, dated Aug. 23, 1932, and, as in that case, the shiftable member is movable by means of a gear-rack 57, pinion 58, and the shaft 59, projecting outwardly from the camera.

Inasmuch as the shiftable prisms 29 (39) are firmly or positively located in the shiftable member 56, and the main lens of any camera, or the lenses, such as indicated at 26 and 26a in the several illustrations, of any cameras are movable by the shiftable member 56, of Figs. 8 and 9, considering the shiftable member moved to the position illustrated in Fig. 8, focal vision is cleared in the direction of the arrows 27, being the same reference character used in Fig. 5, through the finder and through the main lens; while, with the shiftable member 56 moved to the position illustrated in Fig. 9, the photographic impression is transmitted in the direction of the arrow 28 directly to the film 25, or to any sensitized surface of any similar member.

Having thus described my invention, I claim:

1. A combination apparatus of cameras and a finder arranged and designed to be operated by a single operator from a certain point of observation, each of said cameras having an individual lens and cooperating parts of the finder for focusing towards differently located objects to form distinct and matching portions for a composite image in the combination apparatus, the cooperating parts including a vision-end suitably arranged for observations from said point and common to the several cameras and having prisms movably mounted between the vision-end and said individual lenses for adjustments in the finder to reflect said portions uniformly disposed at said point in a single composite image.

2. A combination apparatus of cameras and a finder arranged and designed to be operated by a single operator from a certain point of observation, each of said cameras having an individual lens and cooperating parts of the finder arranged about a certain focal axis and each of the cameras having also a swivel support with an axis in alignment with the focal axis of the lens and finder, and the finder having a vision-end observable from said point and having swivel-connections designed to be engaged with said supports, the finder including means to bring the vision-end in focal alignment with said lenses at all times during focusing operations of the cameras.

3. A combination apparatus of cameras and a finder arranged and designed to be operative by a single operator from a certain point of observation, each of said cameras having an individual lens and cooperating parts of the finder for observing distinct and matching portions of exposures of a composite image to be produced in the combination of the cameras, the finder having a vision-end for observations from said point through said lenses.

4. A combination apparatus of cameras and a finder arranged and designed to be operative by a single operator from a certain point of observation, each of said cameras having an individual axially movable lens and cooperating parts of the finder for observing distinct and matching portions of exposures of a composite image to be produced in the combination apparatus, the finder having a vision-end for observations from said point, and prisms movable transversely with respect to and arranged at points between said lenses and said vision-end for momentary observations of the objects focused by the different lenses during the focusing and exposing operations of the different cameras.

5. A combination apparatus of cameras and a finder arranged and designed to be operative by a single operator from a certain point of observation, each of said cameras having an individual lens and cooperating parts of the finder for observing distinct and matching portions of exposures of a composite image to be produced in the combination apparatus, the finder having a vision-end for observations from said point, the finder having furthermore distinct branches with focal axes passing jointly through the common vision-end and individually through said lenses, prisms disposed in said branches movable transversely to said axes for momentarily receiving reflections from said lenses for transmission to said vision-end so as to show a composite image of said portions, and other prisms disposed in said branches turnably around axes concentric with the first-named axes for rectifying said portions into a uniformly disposed whole composite image.

6. In a combination apparatus of distinct cameras with individual lenses and a common finder for all cameras, the finder having a common vision-end and distinct and separate reflection receiving ends in operative connection with said lenses with prisms disposed at different points forming distinct focal axes in distinct branches of the finder, said prisms breaking each of said focal axes into certain bent-portions at angles to one another, each branch having swivel-means whereby said bent-portions in each of said branches can be adjusted to focal adjustments in different directions the several prisms being arranged in distinct groups in the branches between the lenses and the vision-end to reflect a composite image from the lenses to the vision-end.

7. In a combination apparatus of distinct complete cameras with individual lenses, a finder having a common vision-end and distinct and separate reflection receiving ends in operative connection with said lenses of the different cameras, prisms disposed at different points forming distinct focal axes embodied in distinct branches of the finder certain of the prisms being disposed to break the directions of the said axes into portions at angles to one another, said branches having swivel-means whereby said portions can be adjusted to focal alignments in different directions with certain of the prisms at points to reflect from one of said portions into another of the portions with the several portions maintained in focal alignment with the vision-end and so as to reflect different exposure portions by way of said reflection receiving ends to the vision-end, and certain of the prisms being disposed turnably around axes concentric to the first-named axes and designed to rectify the reflected portions into a uniformly disposed composite image in the vision-end.

8. In a combination apparatus of distinct cameras with separate lenses and a common finder for all cameras, the cameras having an operative connection for passing a sensitized member from one camera to another of the combination, the finder having a common vision-end and distinct and separate reflection receiving ends each of said ends being connected to one of said cameras in operative focal alignment with the camera lens.

ARMIN FRIED.